US008792677B2

(12) United States Patent
Kephart

(10) Patent No.: US 8,792,677 B2
(45) Date of Patent: Jul. 29, 2014

(54) LARGE VENUE SECURITY METHOD

(75) Inventor: Stanley Loel Kephart, Murrieta, CA (US)

(73) Assignee: Intelligence Based Integrated Security Systems, Inc., Scottsdale, AZ (US)

( * ) Notice: Subject to any disclaimer, the term of this patent is extended or adjusted under 35 U.S.C. 154(b) by 0 days.

(21) Appl. No.: 13/451,240

(22) Filed: Apr. 19, 2012

(65) Prior Publication Data

US 2013/0279757 A1 Oct. 24, 2013

(51) Int. Cl.
*G06K 9/00* (2006.01)
(52) U.S. Cl.
USPC ............ 382/103; 382/105; 340/5.53; 340/5.7
(58) Field of Classification Search
CPC .......... G06K 9/00221; G06K 9/00288; G06K 9/00771; G06K 9/00778; G06K 2209/15; G06T 2207/30201; G06T 2207/30232; G06Q 2240/00
USPC .......... 382/103, 118, 105; 348/156, 157, 148; 340/5.2, 5.52, 5.53, 5.7, 5.82, 5.83; 705/325
See application file for complete search history.

(56) References Cited

U.S. PATENT DOCUMENTS

| | | | | |
|---|---|---|---|---|
| 4,774,571 A * | 9/1988 | Mehdipour et al. | .......... | 358/108 |
| 7,323,980 B2 * | 1/2008 | Faulkner et al. | .............. | 340/521 |
| 7,460,028 B2 * | 12/2008 | Garibotto et al. | ............. | 340/937 |
| 7,466,223 B2 | 12/2008 | Sefton | ........................... | 340/521 |
| 7,735,728 B2 * | 6/2010 | Wallerstorfer | ................ | 235/382 |
| 2005/0288937 A1 * | 12/2005 | Verdiramo | ....................... | 705/1 |
| 2006/0017562 A1 * | 1/2006 | Bachelder | ..................... | 340/531 |
| 2007/0133844 A1 * | 6/2007 | Waehner et al. | ............. | 382/118 |
| 2008/0258880 A1 | 10/2008 | Smith et al. | .............. | 340/286.02 |
| 2010/0128931 A1 * | 5/2010 | Bongard | ...................... | 382/105 |

OTHER PUBLICATIONS

Huang et al., "Chapter 24: Face Recognition Applications", Handbook of Face Recognition (edited by Li et al.), Springer-Verlag, 2011, pp. 617-638.*
"Fusion Centers and the Sharing of Intelligence", www.i2group.com, Issue 1, Aug. 2010, pp. 1-8.
"Automated Facial Recognition", Coplink Face Match, Copyright 2010, published before Jan. 1, 2011, 2 pages.
"The new face of security", by Michelle Speir, Federal Computer Week, Mar. 3, 2002, pp. 1-7.
"Coplink Facial Recognition, Product Overview", Copyright 2009, Knowledge Computing Corp., 1 page.

(Continued)

*Primary Examiner* — Andrew W Johns
(74) *Attorney, Agent, or Firm* — Jefferson IP Law, LLP; Raymond B. Persino

(57) ABSTRACT

A method for reducing violence within crowded venues includes reading license plates of vehicles passing into entry ports of a parking area, and capturing facial images of persons seeking admission to the venue. A computer compares such license plates to a database of vehicle license plates associated with persons with past histories of violence. A computer also compares captured facial images to a database of facial data for persons with past violent histories. Upon detecting a match, the computer creates an alert presented to law enforcement officers at the venue to facilitate detention of such persons for investigation. Information recorded on entry tickets is scanned and saved together with the facial image of the ticket holder. If a violent act occurs, cameras within the venue capture facial images of participants. The computer matches such participants to stored identifying data to assist in the identification and apprehension of such persons.

20 Claims, 8 Drawing Sheets

(56) References Cited

OTHER PUBLICATIONS

"ALPR System Camera Configuration", Pips Technology, Jan. 18, 2006, 1 page.
"7 Casino Technologies They Don't Want You to Know About", by Brad Chacos, Maximum Tech, www.maximumtech.com, Aug. 4, 2011, pp. 1-8.
"Competitive Survey and White Paper of Automated License Plate Recognition (ALPR) Vendors", Police Technology Review, Copyright 2008, published before Jan. 1, 2009, pp. 1-18.
"PAGIS-Police ALPR Graphical Interface System", PIPS Technology, 2006, 24 pages.
"Face Recognition", National Science and Technology Council (NSTC), Aug. 7, 2006, pp. 1-10.
"Police Agencies Score Quick Successes with Mobile ALPR Systems", Press Release, Federal Signal Safety and Security Systems, Mar. 1, 2010, 2 pages.
"Can a picture catch a thousand criminals?", by Dibya Sarkar, Federal Computer, Aug. 6, 2001, pp. 1-3.
"Slate (tm) ALPR Camera", Data Sheet, Federal Signal Corporation, 2010, 2 pages.
"Automated License Plate Recognition Investment Justification and Purchasing Guide", Federal Signal Corporation, Aug. 2008, 14 pages.
"Face scans match few suspects", by Lisa Green, St. Petersburg Times, Feb. 16, 2001, pp. 1-5.
""Mugspot" Can Find a Face in the Crowd—Face-Recognition Software Prepares to Go to Work in the Streets", Science Daily, Nov. 1997, 3 pages.
"Big Brother? High-Tech Gadgetry Guards the United Kingdom'S Bluewater. Will the United States Get It Next?", SCT-Shopping Centers Today Online, Apr. 2002, 2 pages.
"Pros and Cons: The Use of Facial Recognition Software in Crime Prevention", by Heidi Attir, Yahoo! Contributor Network, Aug. 22, 2008, pp. 1-2.
"BC considers face scanners at casinos", by Jesse Johnston, www.news1130.com, Jan. 16, 2011, 1 page.

\* cited by examiner

LARGE VENUE SECURITY METHOD

BACKGROUND OF THE INVENTION

1. Field of the Invention

The present invention relates generally to sporting events and other large venue gatherings, and more particularly, to a method for improving the security and safety of persons attending such events.

2. Description of the Relevant Art

Sporting events, such as college and professional level baseball, basketball, and football games, are often attended by tens of thousands of sporting fans. While almost all fans are good-natured, and simply come to have a good time cheering-on their favorite teams, there have been numerous occasions when persons in attendance become rowdy. Fan violence continues to challenge the efforts of venue security staff and local police to protect patrons at sporting venues. For example, in August 2011, a fight broke out among fans attending a pre-season football game between the Oakland Raiders and the San Francisco 49ers held at Candlestick Park, resulting in a fistfight in the stands, and a severe beating in a restroom; two shootings were later reported in the parking lot of the stadium. Recently, a legislator in the State of California proposed legislation making it a misdemeanor for anyone added to a "ban list" from attending a professional sporting event held within the State of California.

Fan violence has led to serious injuries, which cause some fans to question whether sports stadiums are safe for themselves and their families. Such incidents also result in increased costs to team owners and stadium operators for additional insurance, litigation fees, and expanded police and security presence. In turn, these increased costs are often passed along to loyal fans in the form of increased ticket prices, negatively impacting attendance and sales. Incidentally, the aforementioned problems are not limited to sporting events. The same concerns arise during large rock music concerts and other large entertainment venues where crowds of fans gather.

While the problems posed by fan violence are clearly recognized, the police and security officials whose duty it is to maintain order have not been able to make optimum use of available technologies to deal with such problems, and have, instead, been relying primarily on outdated, reactive tactics. Currently, efforts used to counter fan violence rely upon the visible presence of police and security staff interspersed throughout the stadium to deter such incidents, and to detect and respond to fan violence after it happens.

There are some sporting venues which require fans to pass through metal detectors to screen out obvious weapons. In addition, some venues include video cameras and recording systems to monitor or record high-traffic areas of a stadium. Even when such video images are monitored in real time, the person watching such video images can not judge, before the fact, whether persons being observed have violent tendencies. It is only when something appears out of the ordinary, as when a violent act is already in progress, that any action is taken.

Apart from conventional fan violence, our post 9-11 world also requires team owners and stadium operators to be consider terror attacks by suicidal fanatics. Fears that a terrorist might strike at a sporting event, where large crowds are gathered, are a genuine concern. Security personnel routinely inspect backpacks and large purses of fans upon entry, but the identity of those fans is an unknown.

As should be apparent, current security measures employed at sporting venues are not pro-active. In particular, they do not include significant steps to exclude from the venue persons who are likely to be violent and/or dangerous.

Accordingly, it is an object of the present invention to make sporting venues safer for attending fans.

It is another object of the present invention to reduce incidents of physical injuries to sporting fans as a result of violent acts of other fans.

It is still another object of the present invention to reduce costs borne by team owners and stadium managers in order to provide a reasonably acceptable level of safety and security.

Yet another object of the present invention is to provide a method of detecting, and excluding from the venue, persons with past histories of violent tendencies, preferably before they enter the venue.

A further object of the present invention is to assist and aid police and venue security personnel in identifying and detaining person who actively engage in violent acts within the venue during an event.

These and other objects of the invention will become more apparent to those skilled in the art as the description of the present invention proceeds.

SUMMARY OF THE INVENTION

Briefly described, and in accordance with a preferred embodiment thereof, the present invention is a method for reducing violent acts during an event held in a crowded venue, e.g., a sporting event held in a crowded stadium full of spectators. The preferred embodiment of the present method includes the step of compiling a computerized database of facial images of persons who are known to have been violent during similar events in the past. In practicing one aspect of such method, spectators must enter into the venue through one or more entry ports. A photographic facial image is formed for each person who approaches the entry port. A computer is used to compare the photographic image of each person seeking entry to the facial images that were already compiled in the computerized database; if the computer detects a likely match between the facial image of a person about to enter the venue with a facial image already compiled in the computerized database, the computer generates an alert. A video display is provided proximate to the entry port for use by a law enforcement officer. A law enforcement officer is stationed proximate to the video display as spectators are entering into the venue. In those instances where the computer has detected a likely match between the photographic image of a person seeking entry and a facial image of a person known to have been violent during similar events in the past, information is displayed to the law enforcement officer on the video display. The information displayed to the law enforcement officer alerts the law enforcement officer that a match has been detected between a person seeking entry and a person known to have been violent during similar events in the past.

Preferably, a venue security staffer is positioned near the entry port, and near the aforementioned law enforcement officer. The law enforcement officer, after viewing an alert, can then advise the venue security staffer that a person seeking entry is known to have been violent during similar events in the past. The venue security staffer can then decide whether or not to allow such person to attend the event in accordance with the policies of the particular venue.

In practicing the present invention, the computerized database of compiled facial images of persons who are known to have been violent in the past may be expanded to include facial images of persons subject to outstanding arrest warrants. In this case, a law enforcement officer stationed near the entry port is promptly alerted to the detection of a likely match between the photographic image of the ticket holder and a facial image of a person known to have an outstanding warrant for arrest. The law enforcement officer can then detain such person to confirm whether he or she is, in fact, is the same person whose arrest is being sought.

Preferably, entry tickets are distributed to persons wishing to attend the event before such persons enter into the venue. This may include tickets issued in advance to season-ticket holders as well as tickets purchased individually "on-line" or just outside the venue. In this case, a photographic image is formed of the face of each ticket holder seeking to enter into the venue before each such ticket holder presents his or her ticket for entry. Preferably, each such ticket is received, either temporarily or permanently, by a ticket-taker stationed at the entry port. This "ticket-taker" could be an actual person, or alternatively, an automated ticket-taking machine.

In either case, the "ticket-taker" is preferably provided with an electronic ticket reader for creating data signals that are based upon information recorded on each such ticket. This electronic ticket reader might, for example, be a handheld "scanning gun" operated by a human ticket taker; a scanning station provided near a human ticket taker in which the ticket-taker inserts each ticket; or an electronic ticket reader included within an automated ticket-taking machine. The information recorded on the ticket might include, e.g., a seat assignment for the ticket holder, and possibly even the name of the person who paid for such ticket. These data signals created by the electronic ticket reader are preferably stored in an electronic memory.

Preferably, the method of the present invention also includes storing, in an electronic memory, the photographic images formed of each ticket holder who approached the entry port. It is preferred that the storage of the photographic image of each ticket holder in electronic memory is indexed to the stored data signals derived from the ticket presented by the same ticket holder; in this way, the data signals created by the electronic ticket reader, which includes seat assignment data, can easily be associated with the facial image of the person assigned to such seat. Were an incident of fan violence to later break out, it may be advantageous to know what seat was assigned to a particular spectator having a particular facial image.

Yet another aspect of the present invention relates to reducing violent acts at venues which provide one or more parking areas to accommodate vehicles driven by spectators wishing to attend such event. In practicing this aspect of the invention, a computerized database is compiled of vehicle license plates associated with persons who are known to have been violent during similar events in the past. One or more entry ports are provided for vehicles to enter into the venue parking area. A license plate reader is provided at each such entry port for reading the license plate associated with each vehicle entering into the parking area; depending upon the locale, such license plate readers may either be directed toward front-end mounted license plates, rear-end mounted license plates, or both. A computer is used to compare the license plate of each vehicle seeking entry to the parking area with license plates compiled in the computerized database to detect a match. A law enforcement officer is stationed proximate to the parking area. Upon detection of a likely match between the license plate of a vehicle entering the parking area and a vehicle associated with a person known to have been violent during similar events in the past, an alert is provided to the law enforcement officer. Preferably, this alert is communicated by providing a video display proximate to the law enforcement officer, and displaying on the video display the license plate, vehicle description, and information relating to a person associated with such vehicle.

To further increase the effectiveness of the aforementioned method, vehicles parked in areas surrounding the venue may also be included. Preferably, a mobile license plate reader is provided in or upon a law enforcement vehicle. By way of example, the mobile licenses plate reader may include a camera mounted proximate the roof of the law enforcement vehicle. A law enforcement officer drives such law enforcement vehicle along streets neighboring the venue while directing the mobile license plate reader at license plates of parked vehicles being passed by the law enforcement vehicle. A computer is used to compare the license plate of each vehicle parked along such neighboring streets with license plates compiled in the computerized database to detect a match. If a likely match, between the license plate of a vehicle parked on a neighboring street and a vehicle associated with a person known to have been violent during similar events in the past, is detected, an alert is created to warn the law enforcement officer driving such law enforcement vehicle of the likely presence of such person near the venue.

In practicing the present invention, the computerized database of compiled vehicle license plates associated with persons who are known to have been violent during similar events in the past may be expanded to include license plates of vehicles which have been reported to be stolen. In this way, a law enforcement officer, either stationed within the venue parking area or driving along surrounding streets, is alerted to the detection of a likely match between a license plate of a vehicle that has entered the parking area, or which is parked nearby, and a license plate of a vehicle which has been reported to be stolen. The law enforcement officer can then attempt to detain the occupants of such vehicle to investigate whether they should be arrested.

Similarly, the computerized database of compiled vehicle license plates associated with persons who are known to have been violent during similar events in the past may be expanded to include license plates of vehicles license plates of vehicles associated with persons who are subject to an outstanding arrest warrant. In this way, a law enforcement officer, either stationed within the venue parking area or driving along surrounding streets, is alerted to the detection of a likely match between a license plate of a vehicle that has entered the parking area, or which is parked nearby, and a license plate of a vehicle associated with a wanted person. The law enforcement officer can then attempt to detain the occupants of such vehicle to investigate whether they should be arrested.

In practicing yet another aspect of the present invention, a method is provided for locating unruly attendees during an event held in a crowded venue. Tickets are distributed to persons wishing to attend the event; each such ticket includes information identifying a seat assigned to the holder of such ticket. One or more entry ports are provided for persons holding a ticket to enter into the venue. A photographic image is formed of each ticket holder seeking to enter into the venue before each such ticket holder is permitted entry. Also, each ticket presented by each ticket holder at the entry port is electronically scanned, including information identifying the seat assigned to such ticket holder. A computerized database is used to store the photographic image of each ticket holder coming through the entry port, along with the seat assigned to each such ticket holder.

When a violet incident breaks out among attending spectators during the event, a facial image of the unruly attendee is captured; this is preferably accomplished by providing one or more cameras having a telephoto lens inside the crowded venue, and directing such venue cameras at the unruly attendee to capture his or her facial image. A computer is then used to compare the captured facial image of the unruly attendee with the photographic images stored in the computerized database to detect a likely match. Venue security personnel are then alerted to the detection of a likely match between the captured image of the unruly attendee to a photographic image stored in the computerized database. Venue security personnel are also provided seat assignment information for such unruly attendee.

Preferably, the aforementioned method of locating unruly attendees within the venue includes compiling a computerized database of facial images of persons who are known to have been violent during similar events in the past. A computer is then used to compare the captured facial image of an unruly attendee to the facial images compiled in the computerized database to detect a likely match. One or more law enforcement officers are stationed at the venue when a crowded event is being hosted. If a match is detected, an alert is provided to the law enforcement officer, alerting the law enforcement officer to the likely match between the unruly attendee and a person known to have been violent during similar events in the past.

Once again, the compiled computerized database described in the preceding paragraph may be expanded if desired to include facial images of persons who are subject to an outstanding arrest warrant. Upon occurrence of a violent incident, the computer quickly compares the captured facial image of an unruly attendee to the facial images compiled in the computerized database to detect a likely match. A law enforcement officer is then alerted if there is a likely match between an unruly attendee and a person subject to an outstanding warrant for arrest.

Alternatively, the compiled computerized database may be expanded if desired to include facial images of persons who have obtained identification documents from governmental authorities. Upon occurrence of a violent incident, the computer quickly compares the captured facial image of an unruly attendee to the facial images compiled in the computerized database to detect a likely match. A law enforcement officer stationed within the venue is then alerted if there is a likely match between an unruly attendee and a person who has obtained a government-issued identification document. The law enforcement officer is thereby advised of the identity of the person to be apprehended.

DETAILED DESCRIPTION OF THE PREFERRED EMBODIMENT

Figure 1:
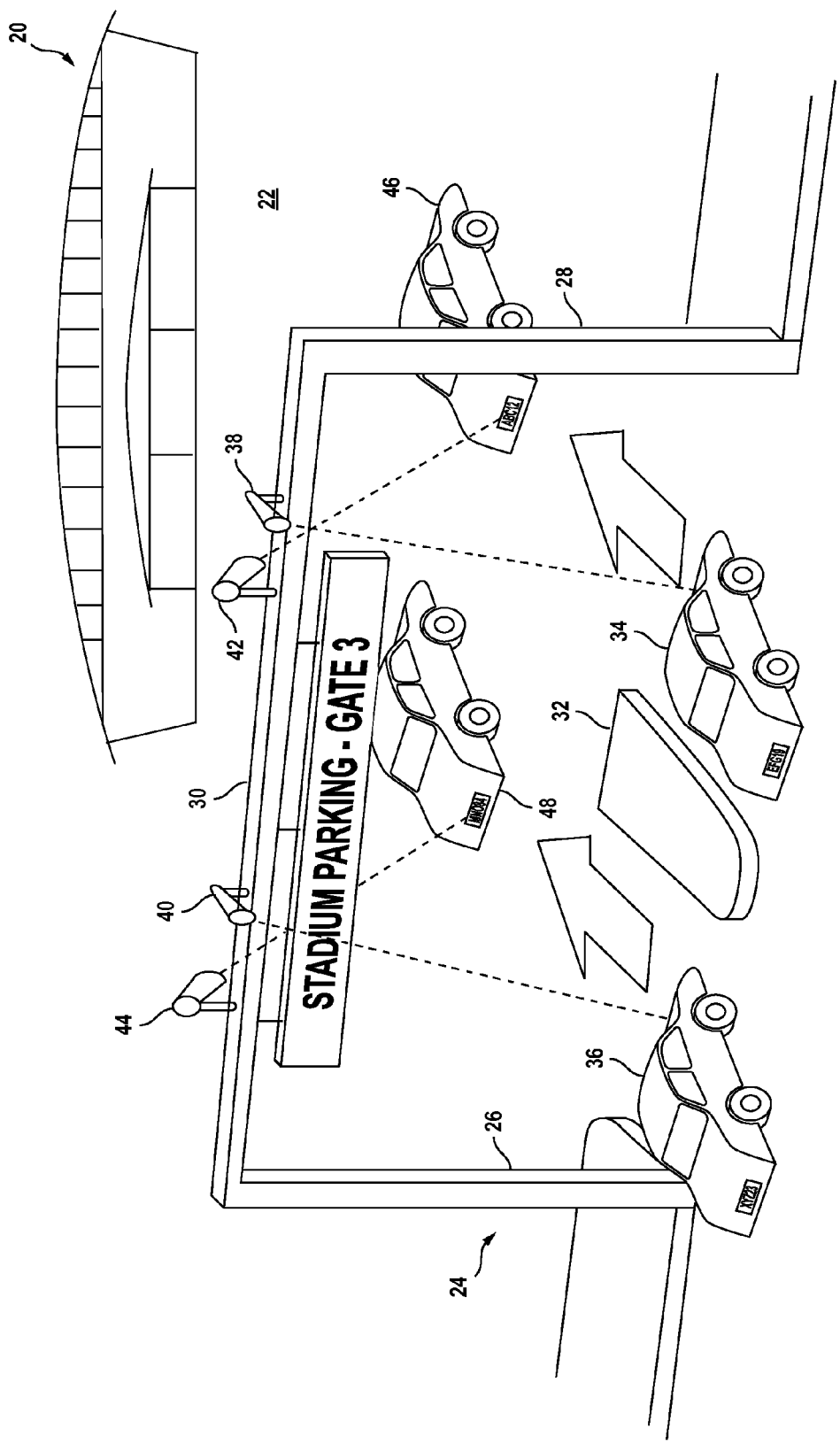
FIG. 1 is a perspective view of a stadium parking lot entry gate equipped with overhead cameras to capture and "read" license plates of vehicles that enter.

Referring to FIG. 1, a sporting event stadium 20 includes a parking area 22 for sports fans to park their vehicles when attending a sporting event. Vehicles entering into parking area 22 pass through one of several entry ports; in FIG. 1, entry gate 24 includes a pair of vertical uprights 26 and 28, and an elevated crossbeam 30 extending across the upper ends of uprights 26 and 28. If desired, gate 24 may include a concrete lane divider, or median, 32 to guide entering vehicles 34 and 36 to the right or left of median 32. While only one parking area 22 is shown in FIG. 1, the stadium may include two or more areas to accommodate vehicles driven by spectators wishing to attend such event.

As indicated above, one aspect of the present invention is to detect that a vehicle associated with a person known to have violent tendencies has entered the stadium parking area 22. Toward this purpose, cameras 38 and 40 are mounted atop elevated crossbeam 30, and are directed to visualize the front end of vehicles, like vehicles 34 and 36, as they pass through entry gate 24. Cameras 38 and 40 are preferably license plate readers of the type commercially available from PIPS Technology Inc. of Knoxville, Tenn., as the Model No. P382 Integrated ALPR System. Such license plate reading systems include dual lens cameras that form both a high-resolution monochrome image of the license plate along with an integrated color image of the overall vehicle. These cameras may include onboard pulsed infrared LED's which illuminate the license plates being imaged even after sundown. These camera systems can transmit data over either wireless or wired networks. They are web-enabled and IP addressable. They can detect the presence of a license plate for triggering a capture of the information on the license plate, and they also include optical character recognition (OCR) engines which automatically convert imaged characters on a license plate into corresponding data characters.

In some jurisdictions, only front-mounted license plates are mandated for vehicles, in which case, cameras 38 and 40 are sufficient. In other jurisdictions, only rear-mounted license plates are required; in that case, license plate cameras 42 and 44 may be provided for imaging rear license plates, for example, the rear license plates mounted on vehicles 46 and 48, respectively. In still other jurisdictions, vehicles must display license plates both from the front and the rear of the vehicle, in which case cameras 38, 40, 42 and 44 may all be in use as vehicles enter into parking gate 24. While license plate cameras 38, 40, 42, and 44 are all shown in FIG. 1 as being mounted in an elevated position upon crossbeam 30, these license plate cameras could also be mounted just above ground level, if desired.

Reading license plates of vehicles entering the stadium parking area can increase the safety of the parking area itself, whether or not the occupants of a vehicle actually plan to enter the stadium proper. It is not unusual for people to park in the stadium parking area without any intention of buying a ticket or entering the stadium. Often people bring recreational vehicles to conduct "tailgate" parties during which alcohol and/or drugs are abused; others come to "scalp" tickets or sell merchandise that is unlicensed and/or counterfeit. Thus, reading license plates of vehicles entering the parking stadium, and checking such license plates against the fusion center database, can reduce the number of unsafe incidents within the stadium parking area.

Figure 2:
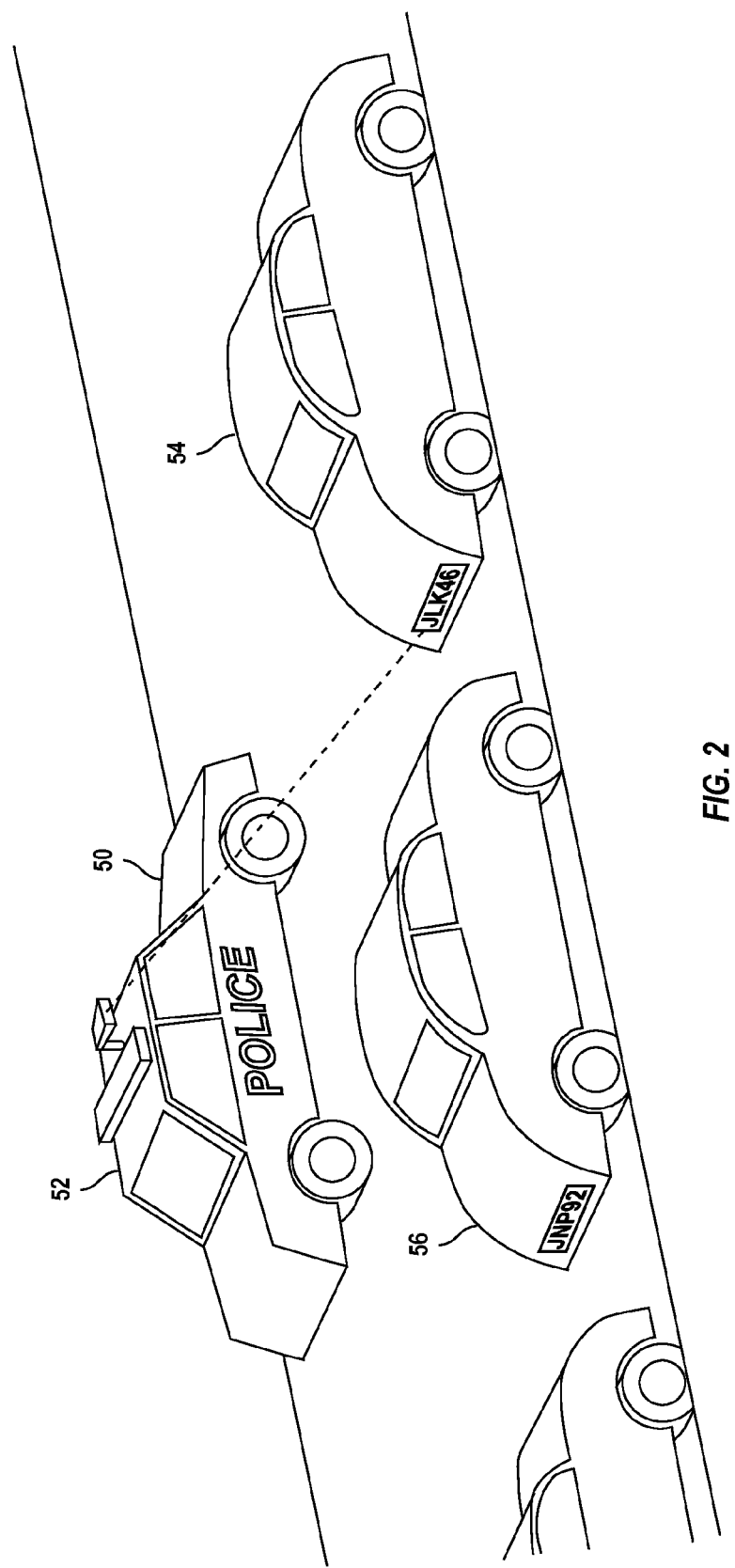
FIG. 2 is a perspective view of a police car driving past vehicles parked on public streets or in private lots near a stadium and equipped with a roof-mounted license plate reader camera to capture license plate information for parked vehicles.

As also indicated above, it is preferred that the reading of license plates not be limited to the stadium parking lot itself, but that it be extended to neighboring streets and/or surrounding private parking areas. In this regard, FIG. 2 shows a police car 50 equipped with a mobile license plate reading camera 52. Camera 52 is preferably mounted to the exterior of police car 50, although a handheld camera may also be used. Camera 52 may be of the type commercially available from PIPS Technology Inc. of Knoxville, Tenn., as the automated license plate recognition (ALPR) Slate™ camera system. These license plate-reading cameras have a compact, low-profile design that can be mounted to the roof of police car 50, just below conventional police vehicle emergency lightbars. The Slate cameras incorporate infrared illumination, together with an infrared camera, for license plate imaging, as well as a color camera to provide a vehicle overview image. The infrared light source provides adequate illumination for the infrared-sensitive camera irrespective of ambient conditions, yet the illuminating flash, or beam, of light is not visible to the human eye. These cameras also include OCR engines for rapidly converting license plate images into readable characters.

While FIG. 2 shows camera 52 being mounted on the right side of police car 50 and directed toward rear-mounted license plates of vehicles 54 and 56 parked to the right side of police car 50, mobile camera 52 may also be mounted on the left side of police car 50 and directed toward front-mounted license plates of vehicles parked to the left side of police car 50. Mobile camera 52 may also be directed rearwardly, rather than forwardly, to image front-mounted license plates of vehicles parked to the right of police car 50 within those jurisdictions requiring license plates to be secured to the front-end of the vehicle. Alternatively, PIPS Technology Inc. also supplies cameras that may be mounted on the rear deck of a police vehicle directed laterally away from police car 50 for imaging license plates of vehicles parked relatively perpendicularly to the path driven by police car 50.

Mobile camera 52 may use an RS232 communication interface for transmitting data to a mobile ALPR processor (not shown), such as the SUPEREX® III mobile ALPR processor available from PIPS Technology Inc. of Knoxville, Tenn. The mobile ALPR processor is preferably mounted in the trunk of police car 50, and includes a dedicated processor engineered specifically for vehicle environments. This processor includes an input terminal for coupling with a GPS receiver to record geographical position signals synchronously with recorded license plate data. While not shown in FIG. 2, police car 50 preferably includes a video display monitor mounted within view of the driver for displaying alerts described in greater detail below. In this regard, a simple network cable can connect the mobile ALPR processor to a laptop, Mobile Data Computer (MDC), or tablet PC running PAGIS™-brand in-car system software available from PIPS Technology Inc. The mobile ALPR processor can also exchange data over the Internet, or over a private network, via a wireless modem.

Both the fixed-base license plate-reading cameras 38, 40, 42 and 44 of FIG. 1, and the mobile license-plate reading camera 52 of FIG. 2 read information appearing on a license plate associated with each vehicle viewed by such cameras. The ALPR license-plate reading camera systems use "frame grabber" technology to capture a snapshot of the vehicle, detect the location of the license plate within such image, and then extract the characters appearing on the license plate for conversion into simple textual characters using optical character recognition (OCR) software. They are capable of "reading" thousands of license plates per hour.

The law enforcement officer operating police car 50 drives police car 50 along streets neighboring the stadium while directing the mobile license plate reader camera 52 at license plates of vehicles parked along such neighboring streets; this may include driving alongside private parking lots located near the stadium for imaging license plates that may be viewed from the public street. The aforementioned fixed-base and mobile license plate-reading cameras convert imaged license plates into text corresponding to the letters and numbers displayed on such license plates. This text is then transmitted to a fusion center, in a manner described in greater detail below.

At the aforementioned fusion center, a computerized database is compiled of vehicle license plates associated with persons who are known to have been violent during similar events in the past; a computer in the fusion center compares the license plate of each vehicle seeking entry to the parking area with license plates compiled in the computerized database to detect a match. Likewise, the computer in the fusion center compares the license plate of each vehicle parked in areas neighboring the stadium with license plates compiled in the computerized database to detect a match.

During sporting events, law enforcement officers are stationed within, or proximate to stadium parking area 22. If a vehicle entering parking gate 24 (or any of the other parking gates) bears a license plate that matches a vehicle associated with a person known to have been violent during similar events in the past, or a person known to have violent tendencies, the law enforcement officers stationed in or near parking area 22 are alerted to such fact, including the license plate number, the appearance of the vehicle, and information identifying persons associated with such vehicle who have a past history of violence. Preferably, such information is displayed to law enforcement officers by providing a video display proximate each such law enforcement officer for displaying, on the video display, the license plate, vehicle description, and information relating to one or more persons associated with such vehicle. The aforementioned display may include the video touchscreen display of a conventional "smartphone" issued to law enforcement officers. Such law enforcement officers may then intercept such vehicle in parking area 22 to determine any of such violent persons are present; such law enforcement officers may also contact venue security personnel to determine whether or not such person is eligible for attending the present event.

If desired, such alerts may be expanded to include notice of license plates of vehicles which have been reported to be stolen. Upon receiving such an alert, law enforcement officers assigned to stadium parking area 22 may locate the vehicle in question, and detain its occupants for questioning to determine if they are responsible for the theft of the vehicle. Likewise, such alerts may be expanded to include license plates of vehicles associated with persons who are subject to an outstanding warrant for arrest. Upon receiving such an alert, law enforcement officers assigned to stadium parking area 22 may locate the vehicle in question, and identify its occupants to determine whether the person subject to a related arrest warrant is present within the vehicle.

Similarly, during sporting events, a law enforcement officer is assigned to drive police car 50 along neighboring streets surrounding stadium 20, and to image license plates of vehicles (54/56) parked along such streets. If any such vehicle bears a license plate that matches a vehicle associated with a person known to have been violent during similar events in the past, or a person known to have violent tendencies, nearby law enforcement officers are alerted to such fact, including the license plate number, the appearance of the vehicle, and information identifying persons associated with such vehicle who have a past history of violence. Preferably, such information is displayed to law enforcement officers, including the officer driving police car 50, by providing a video display proximate each such law enforcement officer for displaying, on the video display, the license plate, vehicle description, and information relating to one or more persons associated with such vehicle. Such law enforcement officers may then locate and investigate such vehicle to determine whether any of such violent persons are present; such law enforcement officers may also contact venue security personnel to keep a watchful eye for such persons in case they attempt to enter the stadium.

As in the case of the fixed cameras monitoring the parking gates, the alerts provided in response to license plates scanned by police car 50 may be expanded to include notice of license plates for stolen vehicles. Upon receiving such an alert, the officer driving police car 50 may locate the vehicle in question, monitor the vehicle, detain any occupants who are still present, and warn other nearby officers to apprehend persons returning to the vehicle; a warning might also be communicated to venue security personnel to keep watch for persons suspected of stealing such vehicle. In addition, if such alerts are expanded to include license plates of vehicles associated with persons who are subject to an outstanding warrant for arrest, then the officer driving police car 50 may locate the vehicle in question, monitor the vehicle, identify any occupants still present, warn other nearby officers to apprehend any persons returning to the vehicle, and identify and arrest any such persons subject to an outstanding arrest warrant. The driver of police car 50 could also contact venue security personnel to keep watch for such persons in case they attempt to enter the stadium.

Figure 3:
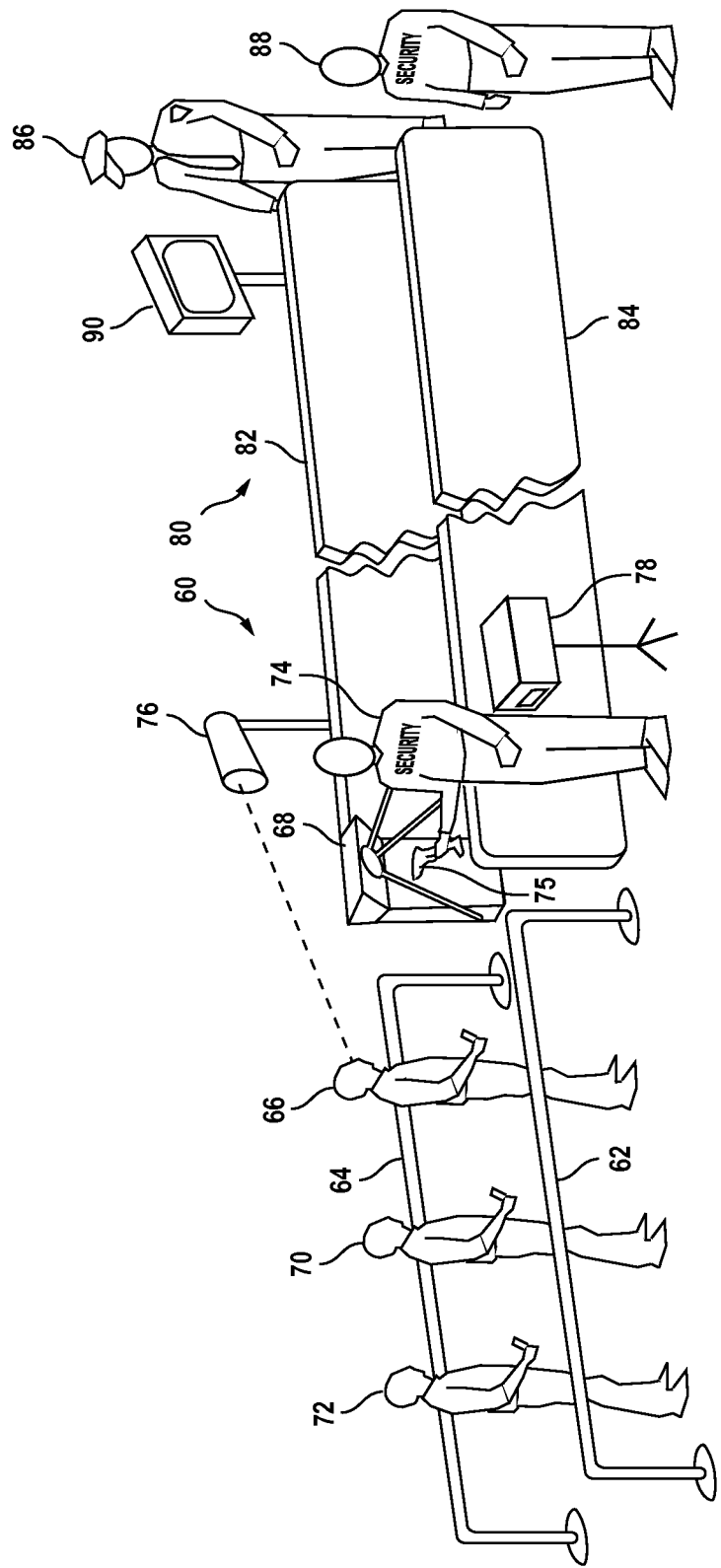
FIG. 3 is a perspective view of fans approaching a fan entry gate equipped with a digital camera imaging each fan as they approach the ticket taker, a ticket scanner to scan each ticket, and a video monitor for a law enforcement officer.

Referring now to FIG. 3, an entry port 60 is provided for persons to enter into stadium 20 of FIG. 1. Entry port 60 may include guide rails 62 and 64 for guiding, or channeling, persons into a single-file line while waiting to be admitted. As shown in FIG. 3, a first person 66 awaits entry into the stadium just ahead of a turnstile 68. Person 66 is followed by persons 70 and 72. Each of persons 66, 70 and 72 is holding an entry ticket. In some cases, these tickets may have been mailed out, or otherwise distributed, to the ticket holders in advance of the event. In other cases, such tickets may have been claimed at a separate "will-call" booth just outside the stadium. In still other cases, such tickets may have been purchased from a ticket booth just outside the stadium.

Each person entering through entry port 60 is greeted by a venue security ticket-taker 74 at turnstile 68. A facial imaging camera 76 is supported near turnstile 68 and is directed toward persons approaching turnstile 68 to form a photographic image of each person who approaches. Facial imaging camera 76 forms a photographic image of each ticket holder seeking to enter into stadium 20 through entry port 60 before each such ticket holder presents his or her ticket for entry. Camera 76 is a component of a facial recognition system which captures facial images of persons seeking entry. The captured facial images are transmitted to a computer for comparison to a database of stored facial images. Preferably, the facial images stored in the database are first converted into modeling data derived from actual facial images, of persons who are known to have been violent during similar events in the past. This modeling data requires less storage space in the database than a conventional photographic computer image. This database may also include stored facial images (or data encoded from facial images) of persons who are subject to an outstanding warrant for arrest.

One such facial recognition system which has been successful in the past is commercially available from i2 Inc. of McLean, Va. under the brand name COPLINK®, which includes a face recognition module called "Face Match". While the particular algorithm used by the Face Match module is proprietary, i2 Inc. advises that its technology uses specific facial elements as anchor points within its proprietary 3D surface model of the face. The Face Match algorithm uses mathematical techniques to fit a three dimensional model of a human face on top of a two dimensional image. The result of applying such algorithm is referred to as an Encode Array stored in binary format. An Encode Array is generated for every facial image stored in the compiled database.

Referring again to FIG. 3, each facial image captured by camera 76 is transmitted to the aforementioned fusion center for real-time analysis. Face Match refers to the sampled facial image that is to be analyzed against the previously compiled database as the "probe" image. The probe image submitted to the Face Match module can be in any one of the commonly-used photographic image formats, including JPG, JPE, TIF, and BMP. If an image is presented that includes two or more facial images, the Face Match module will acquire the most dominant face. Facial images presented for analysis may be somewhat tilted to the right or left, so long as both of the person's eyes are visible. In order to compare the probe facial image to those images compiled in the database, the Face Match module first converts the probe image into an Encode Array, using the same algorithm that was used to create Encode Arrays for all of the images stored in the database.

Within the aforementioned fusion center, law enforcement officials compile a computerized database of facial images, or more accurately Encode Arrays, of persons who are known to have been violent during similar events in the past. A computer within the fusion center compares each probe facial image of each person seeking entry into the stadium to the facial images (i.e., the Encode Arrays) already compiled in the computerized database to detect a likely match. The Face Match module is capable of comparing the probe image to approximately 10,000 stored facial images in as little as one second. If a match is detected, the fusion center generates an alert.

One aspect of the present invention relates to the ability to store facial images of persons entering the stadium with other information, including the seat assigned to such person. As noted above, tickets are distributed to persons wishing to attend the event before such persons actually enter into stadium 20. Each seat provided inside stadium 20, and intended for use by a spectator, is uniquely identified (e.g., by Section, Row, and Seat Number), and each ticket identifies a particular seat reserved for use by the corresponding ticket holder. Ticket-taker 74 receives and inspects the ticket of each person seeking passage through entry port 60. In some instances, ticket-taker 74 may take each ticket and retain at least a portion of the ticket presented by each ticket holder.

Information is printed on each ticket. At a minimum, each such ticket includes seat assignment information designating a unique location within the stadium where the holder of the ticket is permitted to sit. For tickets sold and/or distributed in advance of the event, such tickets may also include the name, and perhaps other related information, identifying the ticket holder. Seat assignment information and/or ticket holder identifying information is preferably recorded on the ticket as both conventional text, and in bar code format or as a magnetically-encoded stripe, to facilitate rapid optical/electronic scanning of the information recorded on the ticket. Ticket-taker 74 may use a hand-operated scanner 76, or a free-standing scanner unit 78, to scan each ticket and derive the information recorded thereon. While FIG. 3 illustrates a human ticket-taker 74, those skilled in the art will appreciate that an electronic ticket reader may be provided instead proximate to turnstile 68 for creating data signals based upon information recorded on each such ticket. If desired, a successful scan of the information recorded on the ticket can be made a condition of unlocking turnstile 68 so that the ticket holder may pass through.

The information scanned, or "read", from each ticket is transmitted to a computer database which stores both the facial image, captured by camera 76, of the person who presented such ticket, and the information derived from the corresponding ticket. The digitally-recorded facial image and the scanned ticket information are indexed to each other in the computer database.

Still referring to FIG. 3, after passing turnstile 68, persons entering the stadium pass through a corridor 80 bounded by walls 82 and 84. A police officer 86 and a venue security staffer 88 are stationed at the back end of corridor 80. A video display 90 is provided proximate the back end of corridor 80 for use by police officer 86. Video display 90 is networked to the aforementioned fusion center for displaying alerts to police officer 86. If the fusion center detects a likely match between a person passing through corridor 80 and a person known to have been violent in the past, the alert generated by the fusion center is displayed on video display 90, along with the facial image, name, identifying characteristics (e.g., tattoos, scars, etc.), past offender history, notices of outstanding warrants, terror risks, etc. Police officer 86 may then take appropriate action, including detaining and/or arresting such person, if he or she is the subject of an outstanding warrant or presents a terror risk. If the alert is merely that the person has been violent in the past at similar events, but is not currently subject to arrest, police officer 86 may then advise venue security staffer 88 of such past history. Venue security staffer 88 can then decide, perhaps after consultation with stadium managers, whether the policies adopted by the venue permit such person to be seated, or require that such person be escorted away from the stadium. While video display 90 is illustrated as a relatively large video monitor, those skilled in the art will appreciate that video display 90 could instead be the video touchscreen display of a conventional "smartphone" issued to law enforcement officers.

It should be noted that, while FIG. 3 only shows fans entering through an entry port, facial recognition cameras may also be installed at ticket booths and will-call boxes outside the stadium to alert a law enforcement officer nearby that a match has been detected. In such instances, law enforcement officers and venue security staffers stationed just outside the stadium may then take appropriate action; if such person is not immediately intercepted outside the stadium, law enforcement officers stationed at entry ports can be alerted to be on the watch for such person attempting to enter one of the entry ports.

Figure 4:
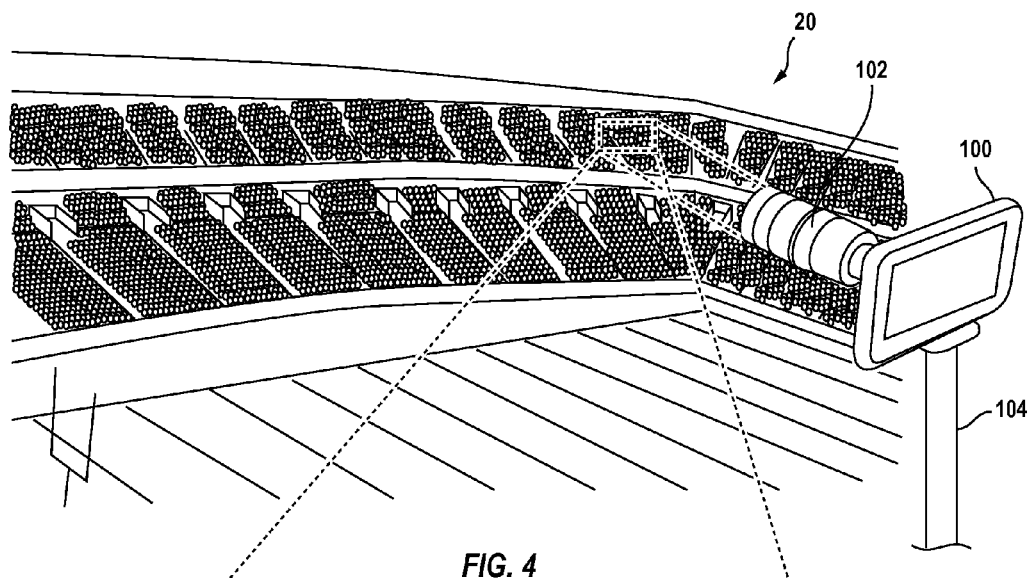
FIG. 4 is a perspective view from inside a stadium, and illustrating one of several stadium cameras equipped with a telephoto lens for capturing images of any fans participating in spontaneous fan violence.

It will be recalled that another aspect of the present invention is to locate, identify, and help apprehend, unruly attendees during a crowded event. FIG. 4 shows spectators seated inside a portion of stadium 20 to watch a sporting event. All of such spectators entered into stadium 20 through one of the entry ports, like that shown in FIG. 3. Thus, the faces of all of such spectators were photographed as they approached the entry port. All of such spectators presented a ticket upon passage through the entry port indicating the seat assigned for such ticket holder. All of the facial images, and ticket information, gathered at such entry ports has been saved in an indexed fashion in a computerized database.

Still referring to FIG. 4, a number of telephoto digital cameras 100 are stationed in secure areas of stadium 20. Each such camera 100 includes a high-powered telephoto lens 102 capable of focusing upon small groups of spectators seated in stadium 20. Camera 100 is preferably supported upon a swivel mount 104 for allowing camera 100 to be pivoted from side to side, as well as up and down. Camera 100 is operated by a venue security staffer, either directly or remotely, during the period of time during which the sporting event is being conducted in stadium 20. If such cameras are operated remotely, then they are provided with pan, tilt, and zoom drive systems to direct the camera toward a desired location in the stadium where violence has broken out. Preferably, the operator of camera 100, and operators of similar cameras within stadium 20, can communicate with a central security command post to coordinate the efforts of such camera operators.

Figure 5:
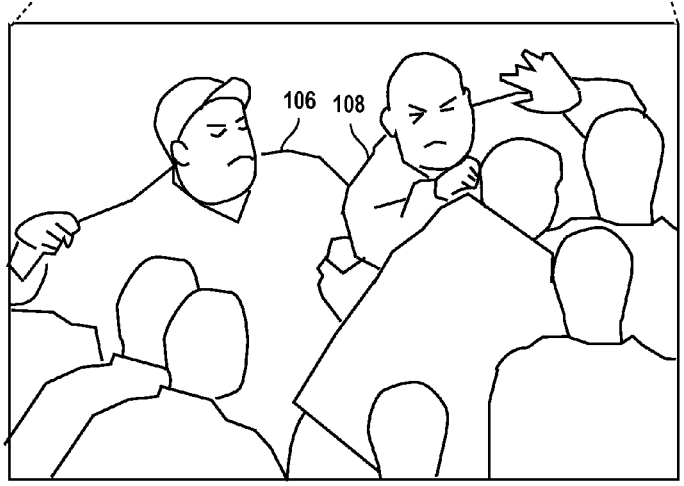
FIG. 5 is a close-up view of the image provided by the camera of FIG. 4, and showing people engaged in a fight in the middle of a sports stadium.

Should an outburst of violence erupt within stadium 20, venue security personnel monitoring the particular section of stadium 20 in which such outburst arises notifies the central security command post. In turn, the central security command post notifies the operators of the telephoto cameras 100 as to the section of stadium 20 in which violence has erupted. The operator of camera 100 then directs camera 100 toward the designated section of the stadium to photograph persons actively participating in such disturbance. FIG. 5 is a close-up view of the image provided by camera 100 in such an instance. Within FIG. 5, camera 100 has provided facial images of two of the participants, 106 and 108. Similar telephoto cameras stationed at other parts of stadium 20 provide images from different angles, and are able to provide facial images of participants whose faces are turned away from camera 100 in FIG. 5.

Just as entry gate camera 76 in FIG. 3 provides facial images to the fusion center as fans enter stadium 20, so too, camera 100 provides facial images to the fusion center of fans engaging in violent acts within stadium 20. Just as the computer in the fusion center served to compare facial images of incoming spectators to a database of persons know to have engaged in violence in the past, in the case of violent outbursts, the computer in the fusion center can quickly compare facial images of trouble-making fans with facial images captured as such fans entered through entry port 60 to detect a match. Moreover, since information recorded on such person's entry ticket, including at least the seat assignment, was indexed in computer storage along with such person's facial image, the row and seat number, and possibly the name, of such violent fan, can be quickly retrieved. This information is then provided to law enforcement authorities and venue security staffers to aid in the identification and apprehension of the unruly attendee. This information can also be rapidly provided to venue security staffers and law enforcement officers stationed at stadium exit gates to help ensure that offenders do not easily escape capture.

To further identify persons who are caught engaging in violence within stadium 20 during a sporting event, the facial images of offenders that are transmitted to the fusion center may be compared to an expanded database of facial images maintained by government agencies, including known criminals, persons subject to an outstanding arrest warrant, as well as non-criminal databases of persons who have obtained identification documents from governmental authorities, including, e.g., motor vehicle driver license records. In this manner, the offenders may be quickly identified to aid in their apprehension.

Figure 6:
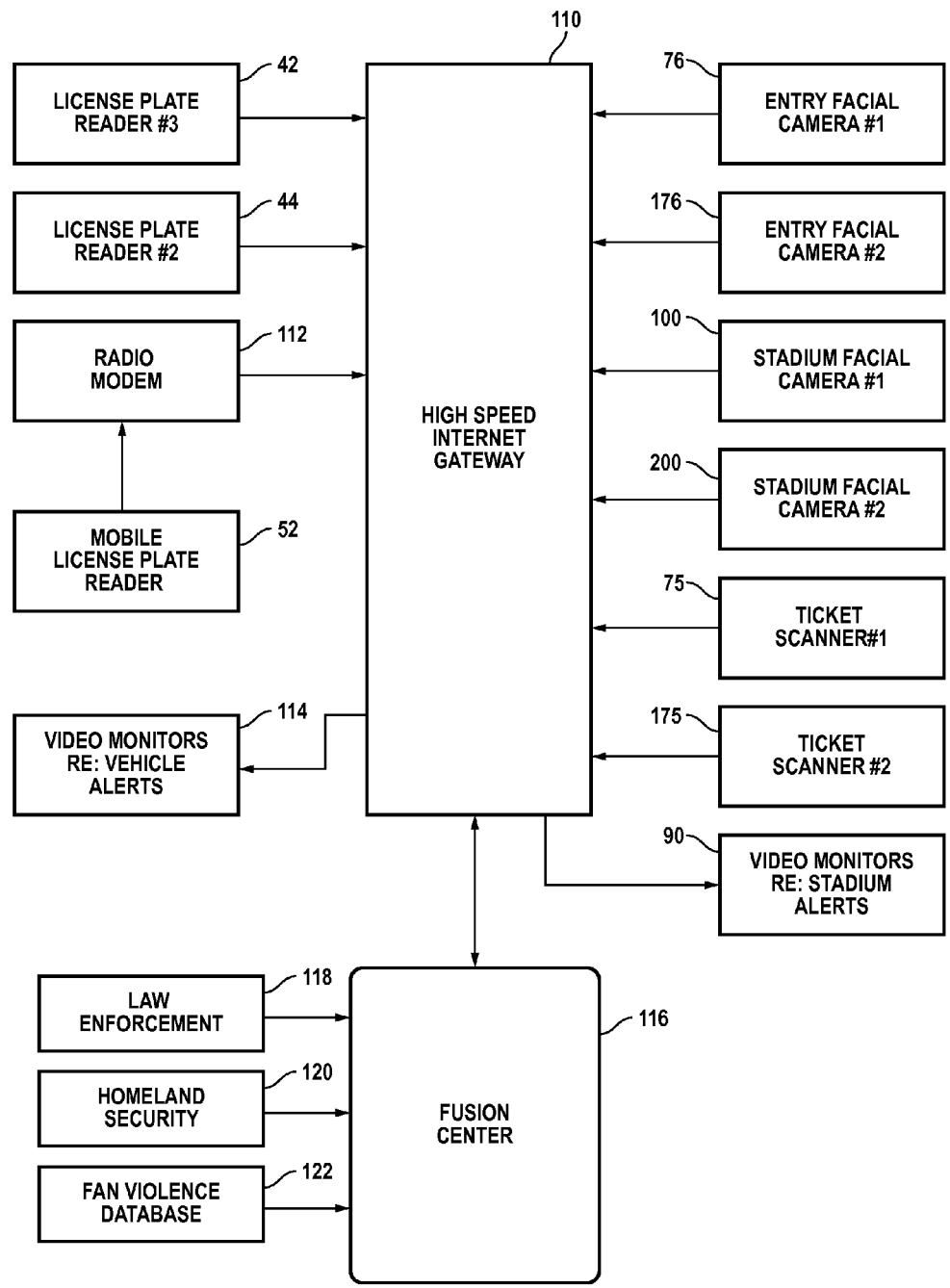
FIG. 6 is a block diagram showing the basic components of a system for implementing the method of the present invention.

Turning to the block diagram of FIG. 6, fusion center 116 is a data center located remotely from stadium 20. Fusion centers were initially founded in response to the terrorist attacks conducted on Sep. 11, 2001. Fusion centers are designed to share information and intelligence between federal, state, tribal, and local law enforcement agencies to better fight crime and terrorism. So-called "data fusion" facilitates the exchange of information from different sources, including homeland security, law enforcement agencies and public safety departments, among others. Such sharing of information must, however, comply with federal and state laws that protect individual constitutional rights and privacy.

In FIG. 6, fusion center 116 receives regular updates from law enforcement agencies 118 regarding persons who have engaged in violent behavior generally and/or who have a criminal past; these update include facial images of such persons. Fusion center 116 processes such facial images, using COPLINK software, to simplify such facial images to a highly compact digital form in the manner explained above. Likewise, fusion center 116 receives regular updates regarding stolen vehicles and related vehicle license plates.

In FIG. 6, fusion center 116 is also shown communicating with Homeland Security Center 120. Homeland Security Center 120 is federally-operated and maintains its own closely-guarded database of information relating to national security issues. The amount of information provided by Homeland Security Center 120 to fusion center 116 is likely to be closely controlled. On the other hand, information received by fusion center 116 may be passed on to Homeland Security Center 120 and/or a Homeland Security official in real time. Homeland Security center 120 can do its own search, using its own guarded database, on data coming into fusion center 116 to detect the presence of persons and/or vehicles which relate to a potential national security interest. In such an instance, Homeland Security Center 120 can signal fusion center 116 with its own alerts, which fusion center 116 may then convey to local police patrolling the stadium.

In addition, fusion center 116 is coupled to a national fan violence database 122. Fan violence database 122 stores facial image data, related identification, and vehicle license plate information for fans who have engaged in violence in the past while attending sporting events, or other activities held in crowded venues. As new acts of violence arise, fusion center 116 updates fan violence database 122 to add information regarding new and repeat offenders.

Fusion center 116 is coupled to each of one or more participating stadiums and/or venues over a high speed Internet Gateway 110. At the stadium-end of high speed Internet Gateway 110, a number of separately-addressable input and output components are networked to fusion center 116. For example, license plate reader cameras 42 and 44 of FIG. 1 send license plate information over Gateway 110 to fusion center 116. Similarly, mobile license plate reader camera 52 of FIG. 2 sends license plate information, via a radio modem 112, over Gateway 110 to fusion center 116. Fusion center 116, in turn, processes such license plate information, compares it to license plates for vehicles associated with those who have engaged in violence, persons who are subject to arrest warrants and/or stolen vehicles, and transmits alerts to video monitors 114 (installed either within the stadium parking area 22 shown in FIG. 1, or within police car 50 in FIG. 2) to signal that a violent fan may be trying to enter the stadium, or that a wanted criminal is present.

Likewise, entry port cameras 76/176 are coupled through Gateway 110 to fusion center 116 to transmit facial images of fans seeking entry into stadium 20. Fusion center 116 compares such facial images to facial image data of known offenders, and if a likely match is detected, fusion center 116 transmits an alert for display on stadium-based video monitors 90 to advise of such match. Ticket scanners 76/176 are also coupled to fusion center 116 via Gateway 110 for forwarding seat assignment data, and possibly identification information, scanned from the ticket presented by each such fan at entry gate 60. Fusion center 116 can store such scanned ticket data indexed to facial image data for the fan who presented such ticket; should an act of violence later breakout, fusion center 116 can quickly find and retrieve data stored for such fan.

Additionally, stadium telephoto facial cameras 100/200 (see FIG. 4) are coupled to fusion center 116 over Gateway 110. If an act of violence breaks out, fusion center 116 can quickly compare captured facial images of the offenders to facial images of fans admitted that day to help identify and locate such offenders. Moreover, fusion center 116 can also compare captured facial images of the offenders with all facial image data available to fusion center 116, from homeland security, law enforcement agencies, licensing records, etc., to better identify such offenders.

Figure 7:
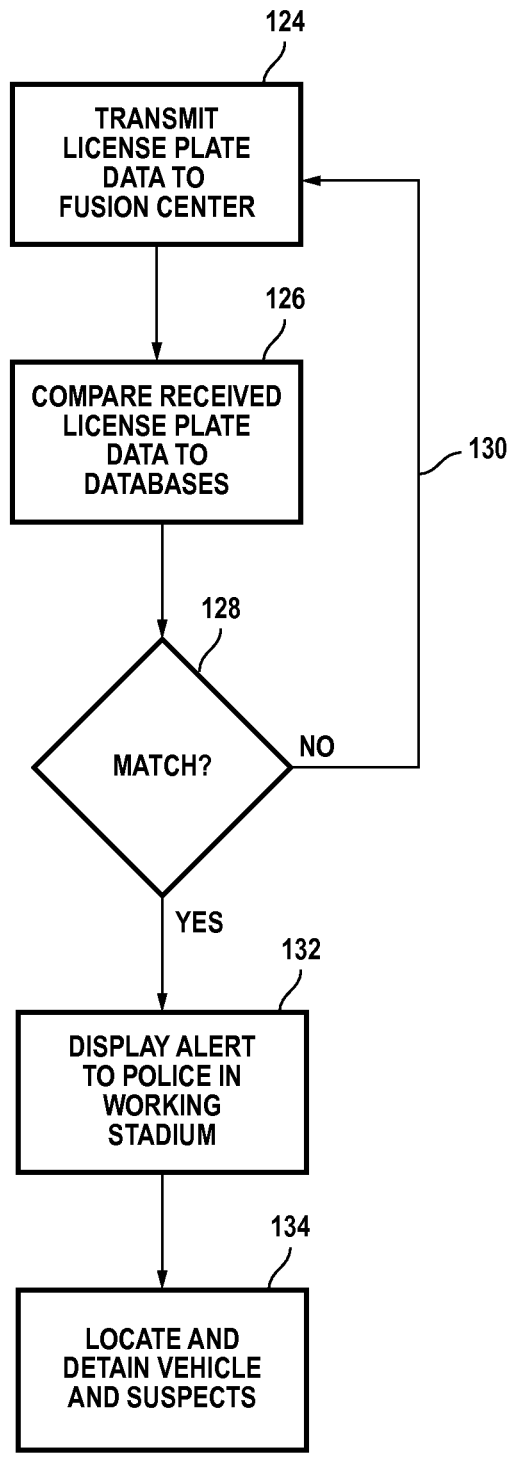
FIG. 7 is a simplified flowchart illustrating steps performed to monitor vehicle license plates scanned by fixed and mobile license plate readers.

FIG. 7 is a simplified flowchart that illustrates the steps performed to process license plate information provided by a local stadium to fusion center 116 of FIG. 6. In FIG. 7, box 124 represents the transmission of vehicle license plate data "read" by cameras 38, 40, 42, and 44 of FIG. 1, and by camera 52 of FIG. 2. Box 126 represents the step performed in fusion center 116 of comparing each received vehicle license plate to previously-compiled license plates: a) associated with spectators who have engaged in violent activities in the past; b) license plates associated with persons subject to arrest warrants; and/or c) vehicles which have been reported stolen. Decision box 128 represents the step of deciding whether or not a match has been detected. If not, control returns back to box 124 to await transmission of license plate data for another vehicle.

On the other hand, if a match is detected, box 132 represents the step performed by fusion center 116 of transmitting an alert for display to police working around stadium 20, either within parking area 22 (see FIG. 1) if the vehicle has entered the stadium parking area, or to a police officer driving police car 50 (see FIG. 2). This alert might include, for example, the name and address of persons known to be associated with such vehicle, past violent histories of such persons, arrest warrants outstanding for such persons, and/or summaries of stolen vehicle reports matching such vehicle. Based upon such alert, police officers can locate and detain the vehicle and any suspects present in the vehicle, as indicated by box 134.

Figure 8:
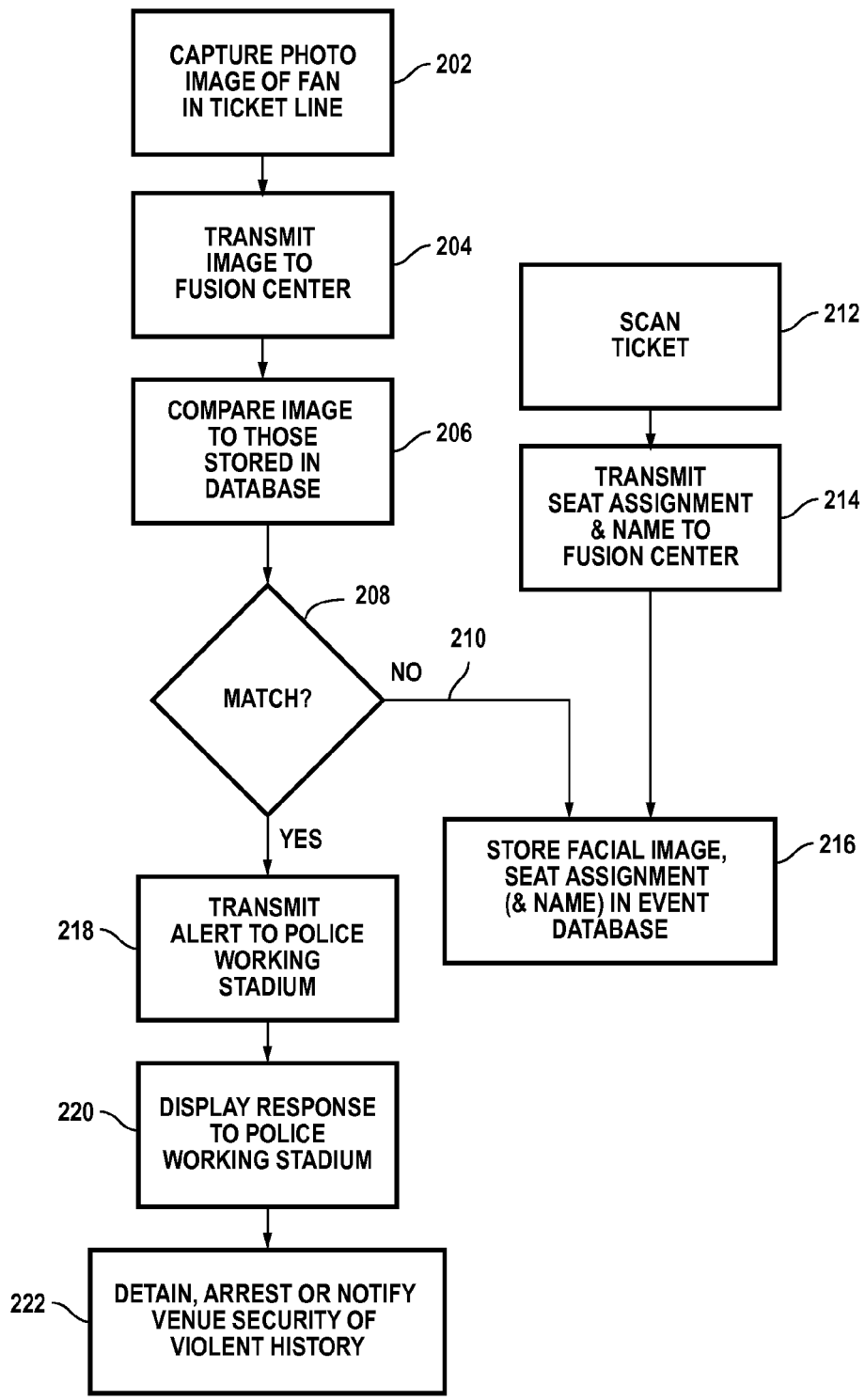
FIG. 8 is a simplified flowchart showing steps performed as each fan enters the stadium through a fan entry gate.

FIG. 8 is a simplified flowchart of the steps performed in conjunction with the fan entry ports to prevent those tending toward violence from being admitted into stadium 20. Boxes 202 and 204 represent the steps of capturing facial images of incoming fans and transmitting such images to fusion center 116. While such images are preferably captured as fans stand in line to present their tickets for admission, such images may additionally be captured as fans claim tickets from a will-call booth, or as they purchase tickets at the stadium ticket office.

At fusion center 116, those captured images are compared to facial images of persons who are known to have engaged in violence in the past at similar events, as indicated by box 206 in FIG. 8. As noted above, box 206 may also include the step of comparing such facial images to previously-compiled images of persons with histories of criminal violence, persons subject to arrest warrants, and/or persons suspected of engaging in terrorist activities.

Decision box 208 in FIG. 8 represents the computerized step of determining whether a match has been detected between the facial image transmitted by the stadium and one of the facial images already stored in one of the target databases. If no such match is detected, control passes via path 210 to box 216 for storing such facial image with information derived from the ticket presented by such person. In this regard, box 212 represents the step of scanning such information from the person's ticket, and box 214 represents the step of transmitting such information to fusion center 116 so that it can be saved in an indexed fashion together with the captured facial image of such person.

In contrast, if decision box 208 determines that a match has been detected, then fusion center 116 transmits an alert, as indicated by box 218, for display to police stationed at the respective entry gate, as indicated by box 220. For example, such alert might be displayed on video monitor 90 at entry gate 60, indicating that a person seeking entry needs to be detained or arrested. Referring to box 222, if such person is not currently subject to arrest, but has been known to engage in violence at similar events in the past, the alerted police officer can notify a venue security staffer, who can make a decision whether to admit, or deny admission to, such fan. If such person is subject to arrest, the police officer can take appropriate action.

Figure 9:
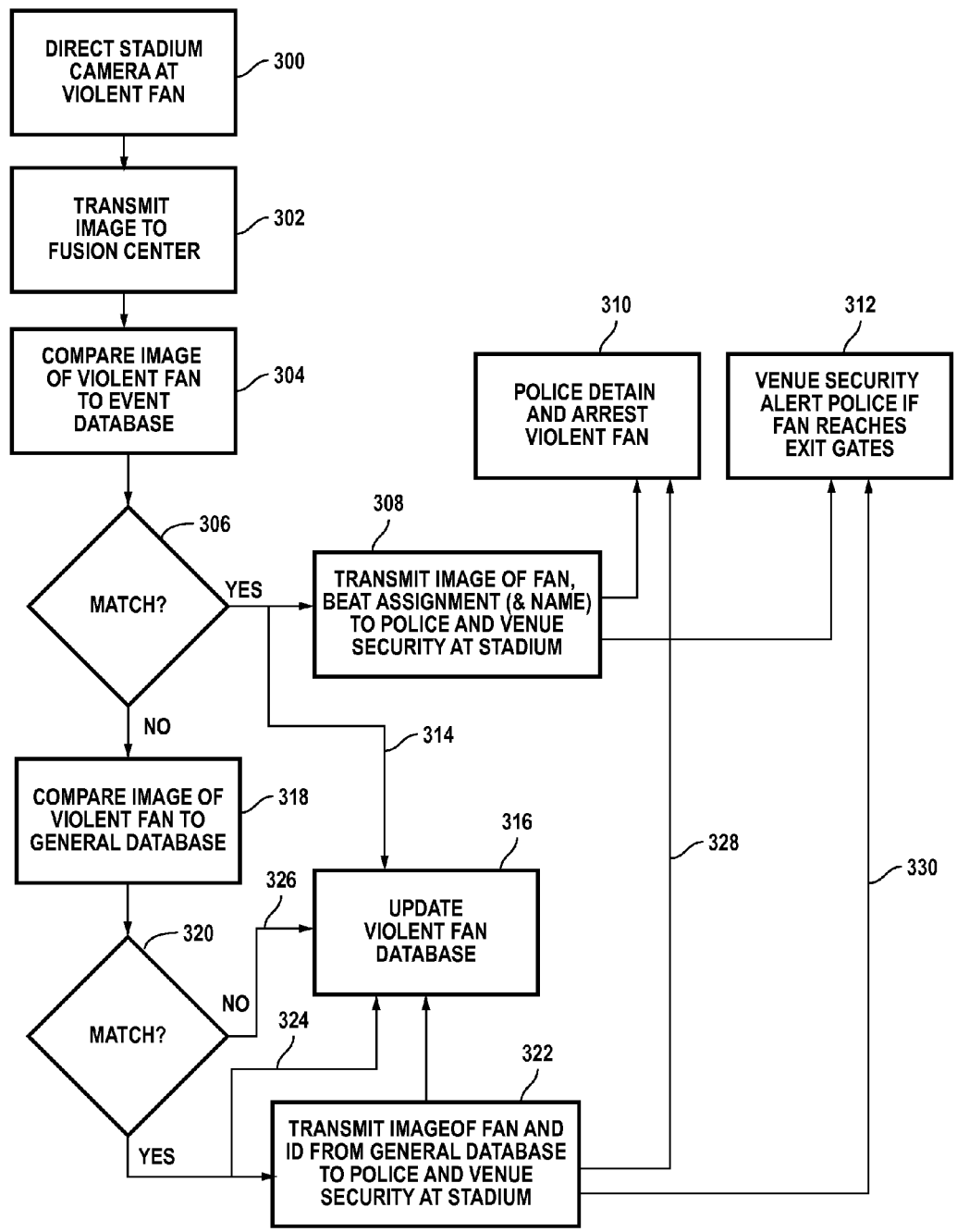
FIG. 9 is a simplified flowchart showing the steps performed if and when an instance of spontaneous fan violence occurs.

The process by which the present invention is preferably used for dealing with an incident of violence is illustrated in the flowchart of FIG. 9. In such instance, one or more operators of the telephoto stadium cameras (100, 200) are directed to focus upon the participants, as indicated by box 300. The facial images of the participants are transmitted to fusion center 116, as indicated by box 302. Fusion center 116 first compares the received facial images to the "event database" created as the fans filled the stadium earlier that day, as indicated by box 304. Decision box 306 represents the step of using the computer at fusion center 116 to determine whether the facial image of a participant has been matched to a person earlier admitted into the stadium. If so, fusion center 116 transmits, to law enforcement and venue security personnel working at stadium 20, an image of the fan, his or her assigned seat, and any other information that was derived from the ticket presented by such fan upon entering the stadium, as indicated by box 308. Box 310 represents the step of detaining and arresting such fan. Were such fan to attempt to escape by heading for an exit, as indicated by box 312, venue security staffers and/or police located near exit gates have information they need to identify the offender, and to stop or monitor the person making such escape.

If for some reason, decision box 306 is unable to detect a match using the "event database" created earlier that day, the captured facial image of the offender can still be compared to more general, previously-compiled databases, to identify the offender, as indicated by box 318. Note that this step might be performed even in the case that the offender is matched within the "event database", simply to obtain additional identifying information concerning such person. If a match is detected, as per decision box 320, pertinent information is transmitted by fusion center 116 to police stationed at the stadium, as indicated by box 322. One alert might be transmitted, via path 328, to police for detaining and arresting the offender inside the stadium (see box 310). A second alert might be sent, via path 330, to police and venue security staffers posted near exit gates (see box 312). In virtually all such instances, information concerning such outbreak of violence is added to the violent fan database (see 122 in FIG. 6), as indicated by box 316 in FIG. 9.

Those skilled in the art will now appreciate that an improved method has been described for making stadiums, sporting venues, and other crowded venues, safer for attending fans. The new method lessens risk of physical injuries to attending fans, and reduces costs of team owners, promoters, and venue managers, while providing a reasonably acceptable level of safety and security. Applicant's above-described method serves to detect, and exclude from the venue, persons known to have been violent in the past, in most instances before they even enter the venue. It is also likely to assist law enforcement officers in catching wanted criminals, and in recovering stolen vehicles.

While the present invention has been described with respect to preferred embodiments thereof, such description is for illustrative purposes only, and is not to be construed as limiting the scope of the invention. Various modifications and changes may be made to the described embodiments by those skilled in the art without departing from the true spirit and scope of the invention as defined by the appended claims.

I claim:

1. A method for reducing violent acts during an event held in a crowded venue, the venue including seating to accommodate spectators to an event, the venue further including at least one parking area to accommodate vehicles driven by spectators wishing to attend such event, the method comprising:

provide at least one entry port for persons to enter into the crowded venue;

forming a photographic image of each person who approaches the at least one entry port seeking entry into the crowded venue;

comparing the photographic image of each person seeking entry into the crowded venue to facial images compiled in a first database of facial images of persons who are known to be violent to detect a likely match;

alerting at least one law enforcement officer of a detection of a likely match between the photographic image of the person seeking entry into the crowded venue and a facial image of a person known to be violent;

providing at least one vehicle entry port for vehicles to enter into the at least one parking area;

providing a license plate reader at the at least one vehicle entry port for reading information appearing on a license plate associated with each vehicle seeking entry into the at least one parking area;

comparing the license plate of each vehicle seeking entry into the parking area with license plates compiled in a second database of vehicles associated with persons who are known to be violent to detect a likely match; and alerting the at least one law enforcement officer of a detection of a likely match between the license plate of the vehicle seeking entry into the at least one parking area and a vehicle associated with a person known to be violent, wherein the comparing of the photographic image of each person seeking entry into the crowded venue includes transmitting the photographic image of each person seeking entry into the crowded venue to a third party and, in response, receiving an alert that the person seeking entry into the crowded venue is known to be violent if the likely match is detected between the photographic image of the person seeking entry into the crowded venue and the facial image of the person known to be violent, and wherein the first database is a third party database controlled by a first entity and the second database is a third party database controlled by a second entity.

2. The method recited by claim 1, further comprising distributing tickets to persons wishing to attend the event before such persons enter into the crowded venue.

3. The method recited by claim 2, wherein the at least one entry port is provided for persons holding a ticket to enter into the crowded venue, and wherein the forming of the photographic image includes forming the photographic image of each ticket holder seeking entry into the crowded venue before each ticket holder presents his or her ticket for entry.

4. The method recited by claim 3, wherein the photographic image formed of each ticket holder approaching the at least one entry port is stored in an electronic memory.

5. The method recited by claim 4, wherein the photographic image of each ticket holder stored in the electronic memory is indexed to data signals stored in the electronic memory derived from the ticket presented by a same ticket holder.

6. The method recited by claim 3, wherein each seat provided in the crowded venue for use by a spectator is uniquely identified, and wherein each ticket identifies a particular seat reserved for a corresponding ticket holder.

7. The method recited by claim 6, wherein an electronic ticket reader is provided proximate to the at least one entry port for creating data signals based upon information recorded on each ticket, and wherein the data signals created by the electronic ticket reader include information identifying the particular seat reserved for the corresponding ticket holder.

8. The method recited by claim 2, further comprising receiving a ticket presented by each ticket holder at the at least one entry port.

9. The method recited by claim 8, wherein the receiving of the ticket includes stationing a ticket taker at the at least one entry port for taking the ticket presented by each ticket holder.

10. The method recited by claim 2, wherein an electronic ticket reader is provided proximate to the at least one entry port for creating data signals based upon information recorded on each such ticket, and wherein the data signals created by the electronic ticket reader are stored in an electronic memory.

11. The method recited by claim 1, wherein the comparing of the photographic image of each person seeking entry into the crowded venue further comprises comparing the photographic image of each person seeking entry into the crowded venue to facial images of persons who are subject to an outstanding warrant for arrest, and wherein the alerting of the at least one law enforcement officer of the detection further comprises alerting the at least one law enforcement officer of a detection of a likely match between the photographic image of the person seeking entry into the crowded venue and a facial image of a person known to have an outstanding warrant for arrest.

12. The method recited by claim 11, further comprising having the at least one law enforcement officer detain the person seeking entry into the crowded venue if the at least one law enforcement officer is alerted that there is the outstanding warrant for the arrest of the person seeking entry into the crowded venue.

13. The method recited by claim 1, further comprising:

positioning at least one venue security personnel proximate to the at least one entry port;

upon the at least one law enforcement officer being alerted of the detection of the likely match between the photographic image of the person seeking entry into the crowded venue and the facial image of the person known to be violent, having the at least one law enforcement officer advise the at least one venue security personnel that the person seeking entry into the crowded venue is known to be violent; and allowing the at least one venue security personnel to decide whether to allow the person known to be violent to enter into the crowded venue.

14. The method recited by claim 1, wherein the license plate reader detects information displayed upon a license plate secured to a rear end of each vehicle seeking entry into the at least one parking area.

15. The method recited by claim 1, wherein the license plate reader detects information displayed upon a license plate secured to a front end of each vehicle seeking entry into the at least one parking area.

16. The method recited by claim 1, further comprising:

providing a mobile license plate reader associated with a law enforcement vehicle;

directing a law enforcement officer to drive the law enforcement vehicle along streets neighboring the crowded venue while directing the mobile license plate reader at a license plate of each vehicle parked along said neighboring streets;

comparing the license plate of each vehicle parked along said neighboring streets with license plates compiled in the second database to detect a likely match; and alerting the law enforcement officer who is driving said law enforcement vehicle of a detection of a likely match between the license plate of the vehicle parked on said neighboring streets and a vehicle associated with a person known to be violent.

17. The method recited by claim 16, wherein the mobile licenses plate reader includes a camera, and wherein the mobile license plate reader camera is mounted proximate a roof of the law enforcement vehicle.

18. The method recited by claim 1, wherein the comparing of the license plate of each vehicle seeking entry into the at least one parking area further comprises comparing the license plate of each vehicle seeking entry into the at least one parking area with license plates of vehicles which have been reported to be stolen, and wherein the alerting of the at least one law enforcement officer further comprises alerting the at least one law enforcement officer of a detection of a likely match between the license plate of the vehicle seeking entry into the at least one parking area and a license plate of a vehicle which has been reported to be stolen.

19. The method recited by claim 1, wherein the comparing of the license plate of each vehicle seeking entry into the at least one parking area further comprises comparing the license plate of each vehicle seeking entry into the at least one parking area with license plates of vehicles associated with persons who are subject to an outstanding warrant for arrest and wherein the alerting of the at least one law enforcement officer further comprises alerting the at least one law enforcement officer of a detection of a likely match between the license plate of the vehicle seeking entry into the at least one parking area and a license plate of a vehicle associated with a person who is subject to an outstanding warrant for arrest.

20. The method recited by claim 1, wherein the alerting of the at least one law enforcement officer of the detection of the likely match between the license plate of the vehicle seeking entry into the at least one parking area and the vehicle associated with the person known to be violent further comprises:
- providing a video display proximate to the at least one law enforcement officer; and
- displaying on the video display the license plate, a vehicle description, and information relating to at least one person associated with the vehicle associated with the person known to be violent.

* * * * *